(12) United States Patent
Krancher et al.

(10) Patent No.: US 9,674,517 B2
(45) Date of Patent: Jun. 6, 2017

(54) MONITORING QUALITY OF VIDEO SIGNALS

(75) Inventors: Robert E. Krancher, Houston, TX (US); Monji G. Jabori, Houston, TX (US); Anura Neysadurai, Houston, TX (US); Richard S. Lin, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1030 days.

(21) Appl. No.: 12/992,841

(22) PCT Filed: May 15, 2008

(86) PCT No.: PCT/US2008/063620
§ 371 (c)(1),
(2), (4) Date: Nov. 15, 2010

(87) PCT Pub. No.: WO2009/139774
PCT Pub. Date: Nov. 19, 2009

(65) Prior Publication Data
US 2011/0063455 A1    Mar. 17, 2011

(51) Int. Cl.
*H04N 17/02*    (2006.01)
(52) U.S. Cl.
CPC ... *H04N 17/02* (2013.01); *G05B 2219/21137* (2013.01)
(58) Field of Classification Search
USPC .......... 345/589; 382/162, 163; 348/488–494, 348/638–658; 358/518–523
See application file for complete search history.

(56) References Cited

U.S. PATENT DOCUMENTS

| 7,187,405 B2 * | 3/2007 | Poplin et al. ............. 348/226.1 |
| 7,701,475 B2 * | 4/2010 | Aoki et al. .................. 345/690 |
| 7,852,489 B2 * | 12/2010 | Sugiyama et al. ............ 356/511 |
| 2010/0034481 A1 * | 2/2010 | Forutanpour ................. 382/275 |

FOREIGN PATENT DOCUMENTS

| KR | 1020040080232 | 9/2004 |
| KR | 1020040083698 | 10/2004 |
| KR | 1020050067931 | 7/2005 |
| WO | WO-0230002 | 4/2002 |

OTHER PUBLICATIONS

"Video Resolution." Dictionary of Communications Technology: Terms, Definitions and Abbreviations, Wiley. Hoboken: Wiley, 1998. Credo Reference. Jan. 1, 2003. Web. Oct. 16, 2012. <http://www.credoreference.com/entry/wileycommtech/video_resolution>.*

International Searching Authority, International Search Report and Written Opinion dated Nov. 27, 2008, pp. 10.

* cited by examiner

*Primary Examiner* — Maurice L McDowell, Jr.
(74) *Attorney, Agent, or Firm* — HP Patent Department

(57) ABSTRACT

In a method and system for assessing video quality, an analog video signal to be assessed is input. At least part of the incoming video signal is converted to digital values. The digital values are stored. A detector determines whether any stored digital value is outside an acceptable range.

18 Claims, 3 Drawing Sheets

MONITORING QUALITY OF VIDEO SIGNALS

BACKGROUND

Almost all computer systems use a display for visible output to a user. Image data is commonly supplied from the computer to the display in the form of an analog signal representing the brightness of the signal along successive lines of a scanning display raster. One commonly used standard for such video signals is the video graphics array (VGA) standard, together with extensions to higher resolutions. The basic VGA standard provided a screen image 640 pixels wide by 480 pixels high, with each row of pixels formed by a line of the scanning raster. A modern display may have a screen image, for example, 1920×1200 pixels. In this example, the screen refresh rate may be 60 frames per second, or 72,000 lines per second.

The VGA standard provides parallel analog signals for red, green, and blue (RGB) channels that can be fed without further processing of the data to an RGB display, for example, a cathode ray tube (CRT). Although digital displays connected by digital interfaces are becoming increasingly common, many CRT and other analog displays are still in use, and many recent computers and displays still support the analog VGA standard for compatibility.

Analog signals are susceptible to analog interference, and an interfering AC signal may cause a periodic modulation in the signal that appears as a fluctuation in the brightness of the image on the display. In the present example, an interfering signal with a frequency of a few hundred kHz (referred to as a "low frequency" signal in the context of computers where operating frequencies of MHz to GHz are normal) can produce a fluctuation repeating several times along the length of the line, that is to say, across the width of the display. This fluctuation in successive lines forms vertical or diagonal stripes over the display that can be unpleasant and distracting for the user. Sources of interference in that frequency range are common. For example, one standard type of switching power regulator found in many computers operates at 300 kHz.

Such "wavy" video has hitherto been detected and assessed primarily by human viewers looking at the display screen. However, the detection of waviness is then at best dependent on the visual acuity of the particular viewer on the particular occasion, and it has been found that the quality of assessment deteriorates markedly as the viewer continues looking at display screens.

It is to be understood that both the foregoing general description and the following detailed description are exemplary and explanatory and are intended to provide further explanation of the apparatus and methods as claimed.

BRIEF DESCRIPTION OF THE DRAWINGS

The accompanying drawings, which are included to provide a further understanding and are incorporated in and constitute a part of this specification, illustrate embodiments and together with the description serve to explain the principles of the invention.

In the drawings.

DETAILED DESCRIPTION

Reference will now be made in detail to various embodiments of the present apparatus and methods, examples of which are illustrated in the accompanying drawings.

Figure 1:
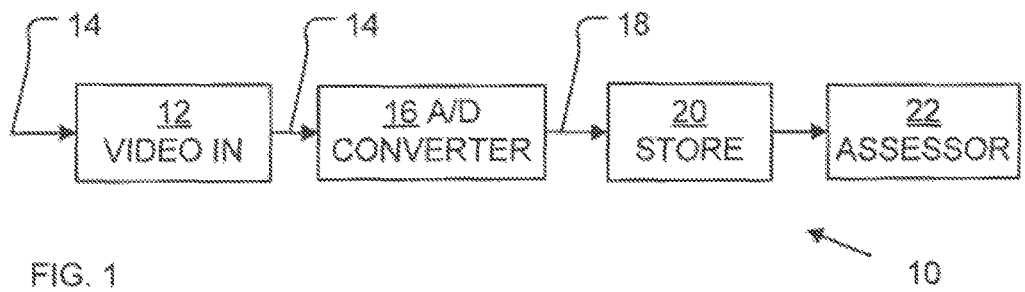
FIG. 1 is a block diagram of an embodiment of a signal test device.

Referring to the accompanying drawings, and initially to FIG. 1, a first embodiment of apparatus for detecting wavy video, indicated generally by the reference numeral 10, comprises a video input 12 for an incoming analog signal 14, in which information is represented as an amplitude varying with time. The video input 12 may comprise a receptacle to which an appropriate standard video cable can be attached, together with any circuitry usually associated with such a receptacle.

The incoming analog signal 14 is passed from the video input 12 to an analog to digital (A/D) converter 16, where the analog signal 14 is converted into a stream of digital values 18. A/D converters for converting an analog video signal into a stream of digital values are well known and, in the interests of conciseness, will not be further described here. Each digital value 18 typically represents the brightness or other property of the image at a point along the rasterized line representing a pixel in a digitalized version of the display.

The digital values 18 from the A/D converter 16 are stored in a data store 20. The stored digital values 18 typically capture the incoming signal for a preselected sample of the incoming analog signal 14, for example, one line of a rasterized display or one or more frames, and can be held for as long as they are required.

The stored digital values 18 are then accessed by an assessor unit 22, which may be, for example, a suitably programmed general purpose computer having read access to the data in the data store 20, or dedicated digital signal processing hardware, or a combination of those and/or other devices.

Figure 2:
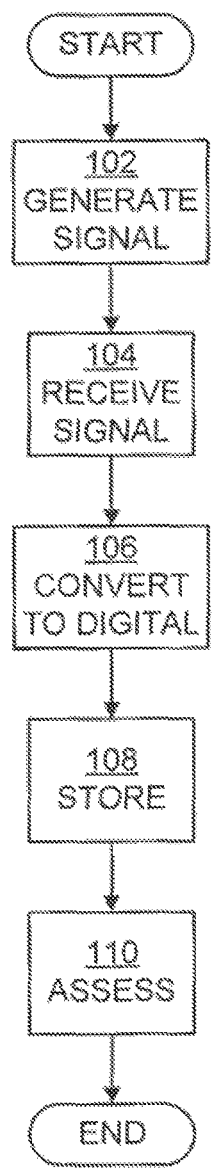
FIG. 2 is a flow chart of an embodiment of a process of testing a signal.

Referring now also to FIG. 2, in a first embodiment of a process for detecting wavy video, in step 102 an analog signal 14 that is to be assessed is provided. The analog signal 14 typically represents the variation in brightness or another property of an image along successive raster lines of a rasterized display. In a simple case, the source of the video is commanded to produce a signal for an image of uniform brightness and color, but other signals may be used, provided the intended signal is known.

In step 104, the incoming analog signal 14 is received by the video input 12, which passes the signal 14 from the video input 12 to the A/D converter 16.

In step 106, the A/D converter 16 converts the analog signal 14, which has an amplitude varying over time, into a stream of digital values 18. Each digital value 18 typically represents the brightness or other property of the image at a point along the rasterized line representing a pixel in a digitalized version of the display. The resolution (number of bits available to represent each value) may be selected to give a desired sensitivity to the subsequent assessment.

In step 108, digital values 18 from the A/D converter 16 are stored in the data store 20. In the embodiment shown in FIG. 2, the stored digital values 18 capture a selection of the incoming signal corresponding to a preselected sample of the incoming analog signal 14, for example, one line of a rasterized display or one or more frames of video, and the sample is held for as long as the data is required. The length of the sample may be determined by the capacity of the data store 20 and the desired resolution, or may be a smaller length that is sufficient for a specific assessment. Alternatively, the volume of data may be reduced by binning blocks of adjacent pixels into single stored digital values 18. That sacrifices sensitivity to single pixel or similarly small errors, but with correct choice of bin size may actually improve the ease of detecting waves tens or hundreds of pixels long, which are of interest in this embodiment.

In step 110, the stored digital values 18 are then assessed in the assessor unit 22 to determine whether the stored values are outside an acceptable range. In the example where the intended signal is a uniform brightness and color, it may be sufficient to determine the average or typical stored digital value 18, and to identify any stored digital value that departs from the average or typical value by more than a certain threshold amount. The presence of stored digital values 18, or of more than a certain number of stored digital values 18, outside the threshold may indicate an unacceptable waviness in the image that may be further investigated.

Figure 3:
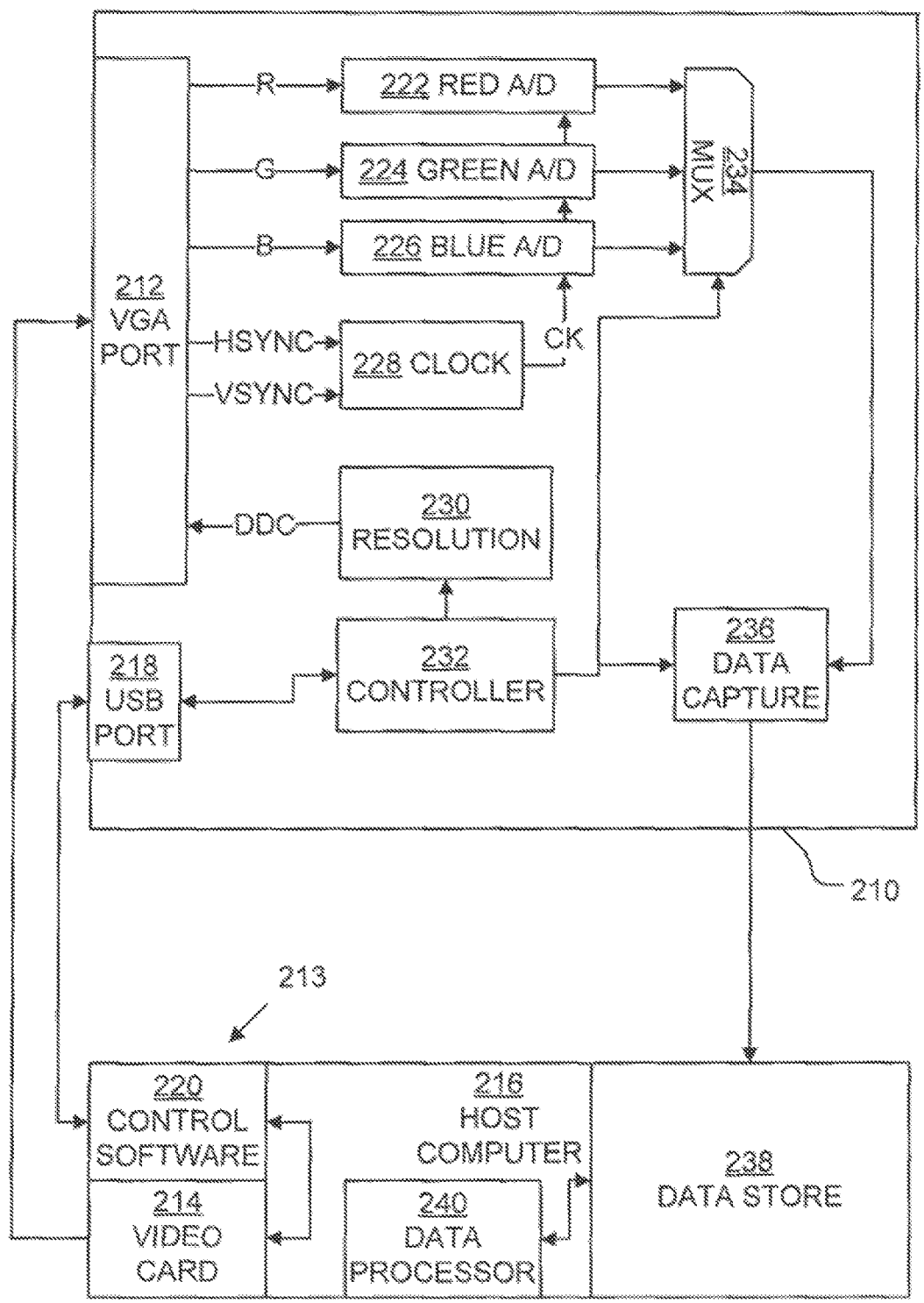
FIG. 3 is a block diagram of another embodiment of a signal test device.

Referring now to FIG. 3, a second embodiment of a system for assessing video quality comprises a test board, indicated generally by the reference numeral 210, having an input port 212 for receiving a video graphics array (VGA) signal from a device under test, indicated generally by the reference numeral 213, which as shown in FIG. 3 is a video card 214 and controlling software 220 in a computer 216, and an output port 218, shown as a USB port, for sending commands to the software 220 running on the computer 216. The software 220 is capable of controlling the display image output through the video card 214, including at least commanding a uniform display in one of a choice of standard colors and brightnesses.

The standard VGA connection includes red, green, and blue analog video lines and horizontal (line) sync (HSYNC) and vertical (frame) sync (VSYNC) lines from the host video card 214 to an assumed monitor (in FIG. 3 actually to the test board 210), and a Display Data Channel (DDC) line from the monitor to the host that enables the monitor to inform the host what resolutions and timings the monitor supports.

The red, green and blue video signals are fed to respective red, green, and blue analog to digital (A/D) converters 222, 224, 226. In an embodiment, only one of the three A/D converters is active at any time, and a single A/D converter fed through a color selector could be used. In an embodiment, however, the VGA input port 212 and the A/D converters 222, 224, 226 are in the form of a commercially available VGA-to-digital display interface. Such interfaces are widely used, and are therefore available as robust, reliable, well documented devices at reasonable cost.

The HSYNC and VSYNC signals are fed to a clock unit 228 that provides a pixel clock signal to the A/D converters 222, 224, 226. A resolution selector 230 generates a DDC signal that can force the video card 214 to a specified resolution by signaling to the video card 214 that is the only resolution that the assumed monitor can accept. Alternatively, the resolution selector 230 may generate a DDC signal representing an assumed monitor that can accept all resolutions of interest, and the actual resolution may be controlled within the host computer 216.

A controller 232 controls the other functions of the test board 210, and through the USB port 218 controls the software 220 in the host computer 216. The controller 232 may include various functions that in the interests of clarity are shown as separate in FIG. 3. In an embodiment where the test apparatus 210 is a computer, the controller 232 may be the CPU of the test apparatus 210. Alternatively, some or all of the functions of the controller 232 may be carried out by a dedicated microprocessor or microcontroller.

The digital outputs from the A/D converters 222, 224, 226 are fed through a multiplexer 234 to a digital data capture module 236, which may be software running on the controller 232 or another processor. The data, comprising digital values for the signal intensity, is then passed to a data store 238, which may be a spreadsheet, on the host computer 216.

A data processor 240, which may be the CPU of the host computer 216 suitably programmed, accesses the data stored in the data store 238, analyzes the data, and provides reports to a human user.

Figure 4:
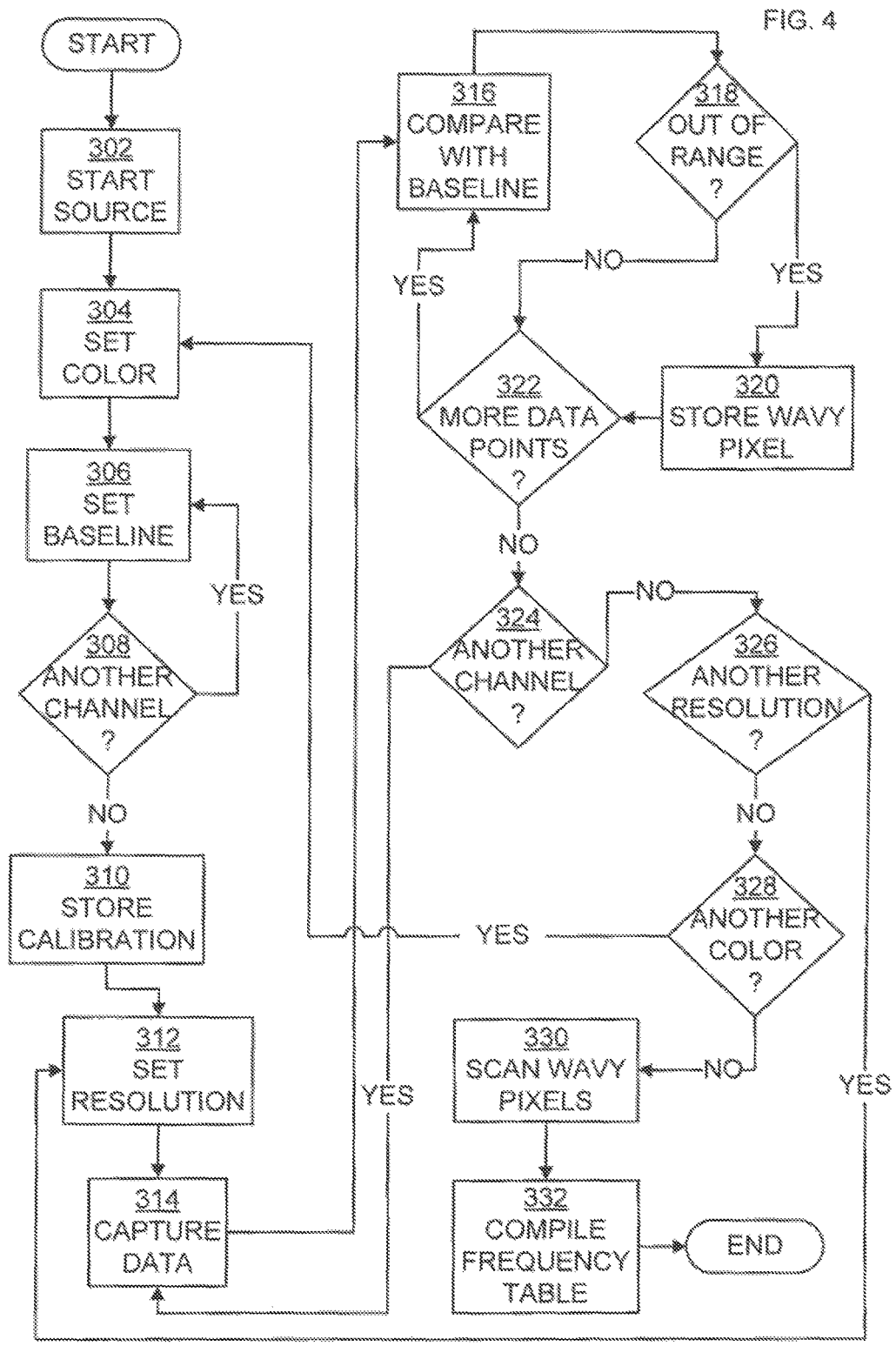
FIG. 4 is a flow chart of another embodiment of a process of testing a signal.

Referring now also to FIG. 4, in an embodiment of a process for assessing video quality, in step 302 the host computer 216 is started up, and establishes communication with the controller 232 of the test apparatus 210, including activating the video card 214.

In step 304, the control software 220 sets the video card 214 to output an "image" consisting of a uniform field of a preselected color. In step 306, the control software, through the controller 232 on the test board 210, commands one of the A/D converters 222, 224, 226 to sample the signal received from the video card 214 through the video port 212 and determine as a baseline the average or typical signal level. In step 308, the process determines whether there is another color channel to baseline and, if so, loops back to step 306.

Where the selected color is an additive or subtractive primary color, the color or colors of zero intensity may be omitted at this stage. A color set to maximum intensity is not omitted unless the characteristics of the video card 214 are already exactly known, because the VGA standard allows the maximum intensity to be represented as a voltage anywhere in the range from 665 to 770 mV, and an accurate value is used later in this process.

The baseline values may be stored for later use. Alternatively, if the A/D converters 222, 224, 226 have variable calibration, each A/D converter may be set in step 310 so that the baseline analog voltage is converted to a selected digital level. In an embodiment the calibration of the A/D converters is set so that the baseline analog voltage is a few levels below the maximum digital value. If appropriate the intensity of each color as emitted by the video card 214 is limited below the nominal maximum of the video card 214 so that the baseline analog voltage is a few levels below the maximum digital value. Departures of the analog value above the baseline can then be converted into digital levels above the baseline, and can subsequently be recognized. The step size may be stored or, if the calibration of the A/D converters is not adjustable, may be retrieved from permanent configuration data.

In step 312, the test program sets the image resolution, either from the control software 220 using the device control utilities of the host computer 216, or via the controller 232, the resolution selector 230, and the DDC channel of the VGA connection.

In step 314, the data capture module 236 captures a specified amount of data from a specified color channel, and passes the data to the spreadsheet data store 238. The amount of data may be considerable. For example, one frame of a display at 1920×1200 pixels, in 8-bit per channel color depth, is about 2.3 MB per channel. One second of recording at that level is about 138 MB of data. In an embodiment, therefore, the periods of capture are kept as short as is reasonably consistent with obtaining sufficient data for subsequent analysis. In another embodiment, the data are "downsampled" by combining and averaging small blocks of consecutive pixels. Where the data are downsampled at the data capture module 236, the bandwidth requirement for the data link from the data capture module 236 to the data store 238 is also reduced.

In step 316, the data points in the data store 238 are compared with the baseline intensities from step 306 by the data processor 240. In step 318, a data point is identified as "wavy" if it is outside an acceptable range around the baseline intensity. For example, a data point may be regarded as "wavy" if it differs from the baseline by a single step, or a larger range may be set. For identifying AC interference on a nominally uniform color, the thresholds between the acceptable range and the "wavy" pixels may be equal distances to either side of the baseline. In an embodiment, the upper threshold is set so that the maximum value (level 255 for an 8-bit color depth) is always "wavy." Where a data point is identified as "wavy," in step 320 the position of that data point, and in some embodiments also the value of the data point, are stored in a separate "wavy pixel" table in data store 238.

The process then continues to inspect and test data points until it is determined in step 322 that all the data points have been inspected and assessed. At this stage, the raw data stored in step 312 may be discarded, freeing up space in the data store 238 for another sampling.

If it is determined in step 324 that there is another VGA color channel to be inspected at the same resolution and image color, then the process returns to step 314 to capture data for the next channel. In one embodiment, all three color channels are sampled and processed except in the case of a color for which one or two channels have zero intensity, when those channels are omitted. In another embodiment, even the zero-intensity channels are sampled, although less good wavy pixel data may be obtained, because negative departures from a zero baseline are usually not detectable.

When all the channels for the present setting have been processed, in step 326 it is determined whether another resolution is to be tested, and in step 328 it is determined whether another image color is to be tested, and if so the process returns to step 312 or step 304 respectively.

In step 330, the previously extracted wavy pixels are further assessed, by comparing the position, which corresponds to the time, for each wavy pixel with that of each other wavy pixel, at least within a certain range of time differences. In step 332, the number of instances of each time difference found in a sample is recorded. The time difference may readily be inverted to yield a corresponding frequency. Where a specific time difference occurs more than a certain number of times, that is taken as indicative of periodic AC interference with the corresponding frequency. The strength of the AC interference may be estimated from the number of detected instances of two wavy pixels separated by the corresponding time difference, and/or by referring back to the magnitude of the departure from the baseline. The list of identified frequencies may then be compared, for example, by a human operator, with the known output frequencies of possible sources of interference.

Various modifications and variations can be made without departing from the spirit or scope of the invention. Thus, it is intended that the present invention cover the modifications and variations of these apparatus and methods provided they come within the scope of the appended claims and their equivalents.

Although in the interests of clarity one sequence of steps has been shown in FIG. 4, the order of many of the steps may be varied. For example, if it is preferred to test all the colors at one resolution together, rather than testing all the resolutions at one color together, the relative positions of step 304 and step 312 may be reversed and step 312 may be placed before step 304.

The wavy pixel extraction steps 316 to 320 may take place later than shown, if there is sufficient capacity in data store 238 to hold more than one sample. The frequency extraction steps 330 and 332 may take place at any time after step 320.

In the interests of simplicity, the description of FIG. 4 refers to wavy "pixels." In the case of downsampled data, each datapoint will correspond to a group of adjacent pixels from the A/D converter binned together, producing, at least notionally, a single "pixel" of a coarser resolution. At a resolution of 1920×1200×60 Hz, the frequency of single pixels is about 138 MHz. However, waviness on a scale of single pixels would usually be scarcely noticeable to the ordinary user. The waviness of greatest concern, and the frequency of many of the known sources of "low frequency" AC interference, is in the range of a few hundred kHz, corresponding to tens or hundreds of pixels. For example, a switching regulator operating at 300 kHz is a known source of interference. In this example, 300 kHz corresponds to a spatial wavelength of about 460 pixels. To detect that sort of frequency, downsampling by a factor of up to about 10 may actually improve detection, by averaging, and thus partially canceling, random noise at higher frequencies.

Although the process of FIG. 4 was described as being fully automated, a partially manual process is also possible, in order to reduce the complexity and cost of the hardware. For example, at step 306 the channel baselines could be measured manually using an oscilloscope.

In the interests of clarity of the drawing, the data processor 240 and the software 220 of the device under test 213 are shown separately in FIG. 3 although, as described above, the data processor 240 may be provided by the CPU of the host computer 216 suitably programmed, and the software 220 of the device under test 213 may also be running on the CPU of the host computer 216. Other arrangements are possible, depending in part on the nature of a specific device under test.

As shown in FIG. 3, the data store 238 and data processor 240 are provided by the host computer 216 under test that contains the video card 214. Alternatively, some or all of the data store 238 and the data processor 240 may be provided by dedicated resources associated with the test board 210, or by a separate computer attached to the system. The host device 216 can then be a device other than a programmable general purpose computer.

What is claimed is:

1. A system for assessing video quality, comprising:
   an input for an analog video signal to be assessed;
   an analog to digital converter to convert a frame of an incoming video signal to digital pixel intensities and bin a plurality of digital pixel intensities together into a single digital pixel intensity by taking their average value;
   a data store for the binned digital pixel intensities; and
   an assessor unit to:
      determine if any of the binned digital pixel intensities are outside of a threshold;
      store a data store position and a value of any binned digital pixel intensities that are outside the threshold in a separate data store file; and
      determine the presence of AC interference by comparing the data store position for each binned digital pixel intensities that are outside the threshold to the other binned digital pixel intensities that are outside the threshold, wherein a repeating distance between pairs of binned digital pixel intensities that are outside the threshold corresponds to a frequency of an AC interference signal.

2. A system according to claim 1, wherein the assessor unit is to determine an average for a set of stored pixel intensities, and to calculate the threshold value from the average.

3. A system according to claim 1 or claim 2, wherein the input is for a video signal comprising a plurality of components, and wherein the data store stores digital pixel intensities corresponding to a selected one of the components.

4. A system according to claim 3, further comprising circuitry for selecting a desired one of the components.

5. A system according to claim 4, further comprising circuitry for successively selecting each of the components.

6. A system according to claim 1, further comprising circuitry for commanding a source of a video signal to supply a desired signal for assessment.

7. A system according to claim 1, further comprising circuitry that in use detects periodically repeating variations In intensity over a sequence of stored digital pixel intensities.

8. A method of assessing video quality, comprising:
receiving an analog video signal;
converting a frame of an incoming video signal to digital pixel intensities and binning a plurality of digital pixel intensities together into a single digital pixel intensity by taking their average;
determining if any of the binned digital pixel intensities are outside of a threshold;
storing a data store position and a value of any binned digital pixel intensities that are outside the threshold in a separate data store file; and
determining the presence of AC interference by comparing the data store position for each binned digital pixel intensities that are outside the threshold to the other binned digital pixel intensities that are outside the threshold, wherein a repeating distance between pairs of binned digital pixel intensities that are outside the threshold corresponds to a frequency of an AC interference signal.

9. A method according to claim 8, further comprising determining an average for a sequence of the stored pixel intensities, and calculating the threshold value from the average.

10. A method according to claim 8 or claim 9, wherein the analog video signal comprises a plurality of components, further comprising storing and assessing digital pixel intensities corresponding to a selected one of the components.

11. A method according to claim 10, further comprising successively selecting different ones of the components.

12. A method according to claim 8, further comprising commanding a source of the analog video signal to supply a desired signal for assessment.

13. A method according to claim 12, further comprising successively commanding the source of the analog video signal to supply at least one of signals having different colors and signals having different resolutions.

14. A method according to claim 8, wherein assessing the stored digital pixel intensities further comprises detecting periodically repeating variations in intensity over a sequence of stored digital pixel intensities.

15. A method for determining wavy video, comprising:
receiving an analog video signal of a set resolution;
converting a frame of the analog video signal to digital pixel values, wherein the portion of the analog video signal is a frame of the analog video signal;
determining a baseline value for the digital pixel values within the frame of the analog video signal;
binning a plurality of digital pixel values into a single digital value by averaging the plurality of adjacent digital pixel values;
storing the binned digital pixel values in a data store;
determining if any of the binned digital pixel values are outside of a threshold;
storing a data store position and a value of any binned digital pixel values that are outside of the threshold in a separate data store file; and
determining the presence of AC interference by comparing the data store position for each binned digital pixel intensities that are outside the threshold to the other binned digital pixel intensities that are outside the threshold, wherein a repeating distance between pairs of binned digital pixel intensities that are outside the threshold corresponds to a frequency of an AC interference signal.

16. The method of claim 15, further comprising calculating the acceptable range and threshold from the baseline.

17. The method of claim 15, wherein the analog video signal is one of the colors selected from the list of red, blue or green and at a selected brightness.

18. The method of claim 15, further comprising altering the analog video signal's resolution.

* * * * *